United States Patent

[11] 3,614,554

[72] Inventors Richard Shield Richardson; Thomas H. Ramsey, Garland, both of Tex.

[21] Appl. No. 770,375

[22] Filed Oct. 24, 1968

[45] Patented Oct. 19, 1971

[73] Assignee Texas Instruments Incorporated Dallas, Tex.

[54] MINIATURIZED THIN FILM INDUCTORS FOR USE IN INTEGRATED CIRCUITS
9 Claims, 8 Drawing Figs.

[52] U.S. Cl. .......... 317/235 R, 317/235 D, 317/234 S, 336/200, 317/235 F

[51] Int. Cl. .......... H01l 19/00

[50] Field of Search .......... 317/235 (22), 234 (8), 235 (22.11), 234 (8.1); 336/200

[56] References Cited

UNITED STATES PATENTS

| | | | |
|---|---|---|---|
| 3,305,814 | 2/1967 | Moyer | 336/200 |
| 3,359,467 | 12/1967 | Cook | 317/234 |
| 3,454,945 | 7/1969 | Hyltin | 343/17.1 |
| 3,413,716 | 12/1968 | Schwertz | 29/602 |

*Primary Examiner*—John W. Huckert
*Assistant Examiner*—Martin H. Edlow
*Attorneys*—Samuel M. Mims, Jr., James O. Dixon, Andrew M. Hassell, Harold Levine, Gerald B. Epstein, Richards, Harris & Hubbard, Henry T. Olsen and Michael A. Sileo, Jr.

ABSTRACT: Thin film inductors for use with miniaturized integrated circuits are fabricated by forming a first level of parallel metal strips on a substrate and then forming an insulating layer over the strips. A bar of magnetic material is disposed along the center portions of the metal strips and a layer of insulation is deposited over the bar of magnetic material. A second level of parallel metal strips is then formed over the layer of insulation and is connected between opposed ends of adjacent ones of metal strips at the first level to form a continuous flattened coil around the bar of magnetic material. In other embodiments of the invention, the bar of magnetic material may be omitted, or may be disposed outside the continuous flattened coil formed by the metal strips.

MINIATURIZED THIN FILM INDUCTORS FOR USE IN INTEGRATED CIRCUITS

BRIEF DESCRIPTION OF INVENTION AND BACKGROUND INFORMATION

This invention relates to inductors, and more particularly to miniaturized thin film inductors for use with integrated circuitry.

Efforts are continuously being made to produce microminiature electronic circuits which may be formed on a single semiconductor wafer. This has been generally accomplished by utilizing integrated circuits in configurations with thin film resistors and capacitors. However, problems have heretofore arisen in the fabrication of inductances with the desired dimensional miniaturization and having adequate inductance and Q-factor.

In accordance with the present invention, a thin film inductor is provided which is compatible with current integrated circuit fabrication technology and yet which provides adequate inductance and Q-factors for use in a multitude of circuits. In one aspect of the invention, a plurality of thin metal strips are deposited upon a substrate and then covered by an insulating layer. A body of magnetic material is deposited over the parallel strips and covered by a second layer of insulating material. A plurality of parallel metal strips are then deposited and connected with the lower level of metal strips to form a continuous flattened coil or helix around the body of magnetic material.

In another aspect of the invention, a generally planar, flattened coil is fabricated on a substrate by forming a plurality of interconnected linear metal strips. The metal strips are then insulated and a bar of magnetic material is deposited over the coil to provide flux linkage.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION

Figure 1:
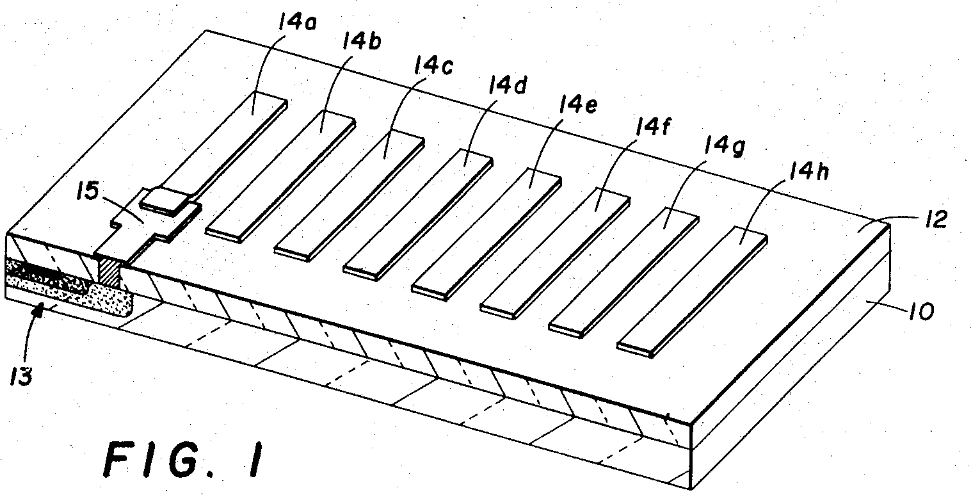
FIG. 1 is a perspective view of the first level of parallel metal strips formed according to the invention.

FIG. 1 illustrates a semiconductor substrate 10 upon which is deposited an insulating layer 12. As an example, the substrate 10 may comprise a portion of a polished silicon wafer with an oxide layer 12 grown upon the surface thereof by the conventional silane or steam process. A monolithic integrated circuit 13 is formed in the semiconductor substrate 10 by conventional techniques. The integrated circuit 13 is illustrated as a conventional triple-diffused transistor, but it will be understood that any one of a number of other integrated circuits could be alternatively utilized. A plurality of parallel metal strips or bars *14a–h* are deposited in a conventional manner upon the surface of the insulating layer 12. One end of the metal strip *14a* contacts an expanded collector contact terminal 15 to connect the collector of the integrated circuit 13 to the metal strip *14a*.

In an example of the formation of the metal strips *14a–h*, a uniform film of metal, such as aluminum, is deposited over the entire surface of the insulating layer 12 and the contact terminal 15 by conventional evaporation techniques. A photoresist material is then applied over the metal film by a conventional technique. The photoresist layer is patterned by exposure through a suitable fixed pattern photomask which exposes areas of the photoresist in the shape of the parallel metal strips. After the photoresist layer is exposed by light projected through the photomask, the photoresist layer is developed by exposure to a suitable developing solution. The silicon wafer is then immersed in a suitable etching solution to define the parallel metal strips *14a–h*. The remaining photoresist is stripped from the metal strips. It will, however, be understood that other suitable techniques for depositing the desired uniform configuration of metal strips may be utilized.

Although the metal strips *14a–h* have been illustrated as being linear and in a parallel configuration, in some instances it may be desirable to form the metal strips in slightly curved configurations or at somewhat skewed orientations to one another. Other high conductivity metals such as tungsten and gold could alternatively be utilized in place of aluminum to form metal strips *14a–h*.

Figures 2, 3:
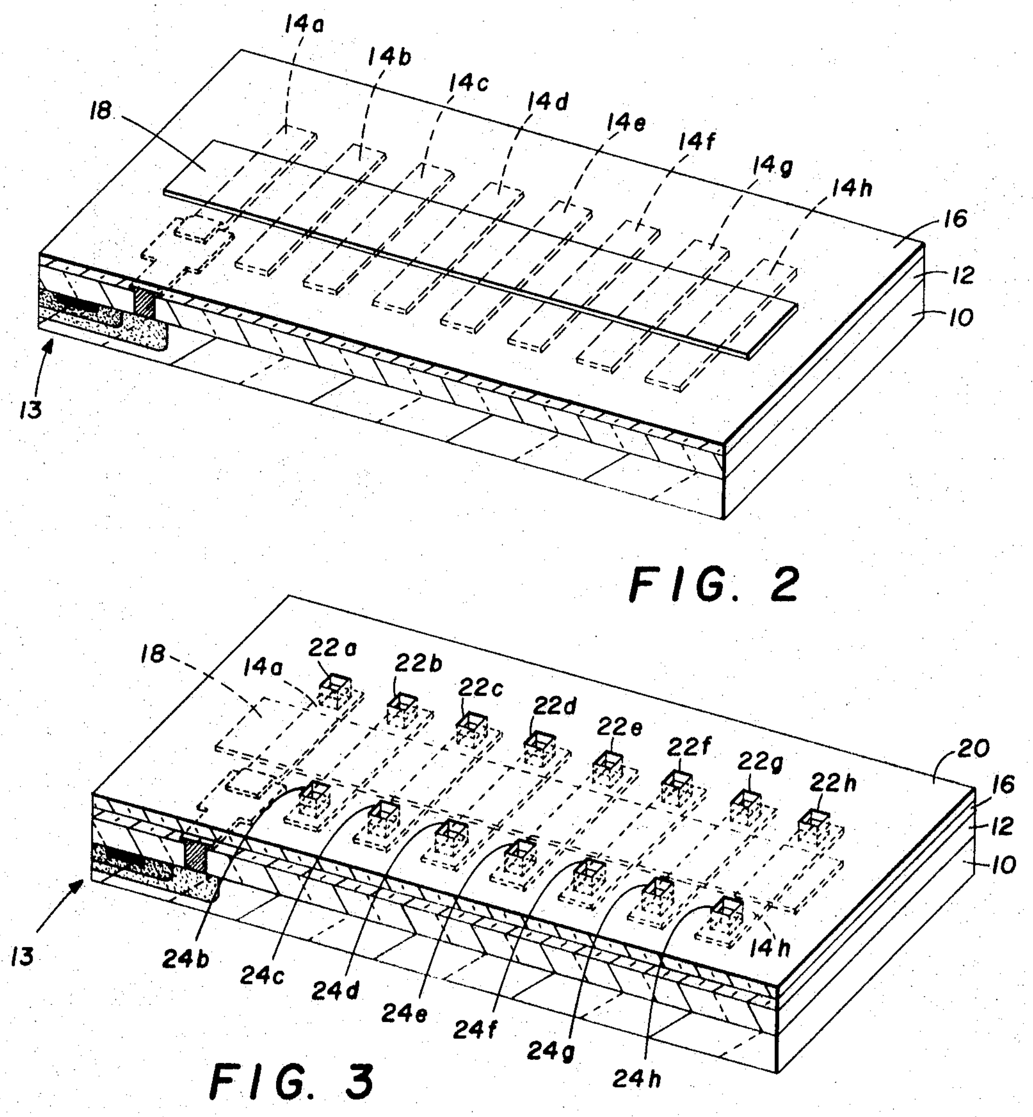
FIG. 2 is a perspective view of the circuit shown in FIG. 1 with an insulating layer and a bar of magnetic material applied thereto.
FIG. 3 is a perspective view of the device shown in FIG. 2 with an additional layer of insulation and feedthrough holes cut therethrough.

As shown in FIG. 2, the next step in fabrication of an inductor is the formation of an oxide layer 16 over the metal strips *14a–h*. The oxide layer 16 may be deposited by any suitable conventional manner, such as with an electron gun or silane reaction. A bar of magnetic material 18 is then formed over the central portions of the metal strips *14a–h* in the manner illustrated. The bar 18 may be formed by depositing a uniform layer of magnetic metal over the upper face of the oxide layer 16 and then removing the excess magnetic metal by conventional photoresist etching steps.

The magnetic bar 18 is formed from a suitable high permeability material such as a ferrite material or a magnetic metal. The choice of a particular magnetic metal will depend upon various desired operating characteristics of the inductor, the operating frequency of the circuit, and the like. A high permeability material which has been found to work well in practice is an alloy of nickel, iron, cobalt, manganese and copper manufactured and sold under the trade name PERMALLOY by Allegheny Ludlum Steel Corporation of Pittsburgh, Pennsylvania. Ferrite material such as barium ferrite may also be advantageously utilized.

After the formation of the magnetic bar 18, another oxide layer 20 is applied by conventional techniques to cover the magnetic bar 18. A plurality of feedthrough holes *22a–h* and *24b–h* are formed through the insulating layers 20 and 16 to the upper surfaces of the parallel metal strips *14a–h*. The feedthrough holes are formed by conventional photoresist and etching techniques, wherein a suitable etching solution, such as buffered hydrofluoric acid, is applied to the oxide layers through a developed photoresist layer.

Figure 4:
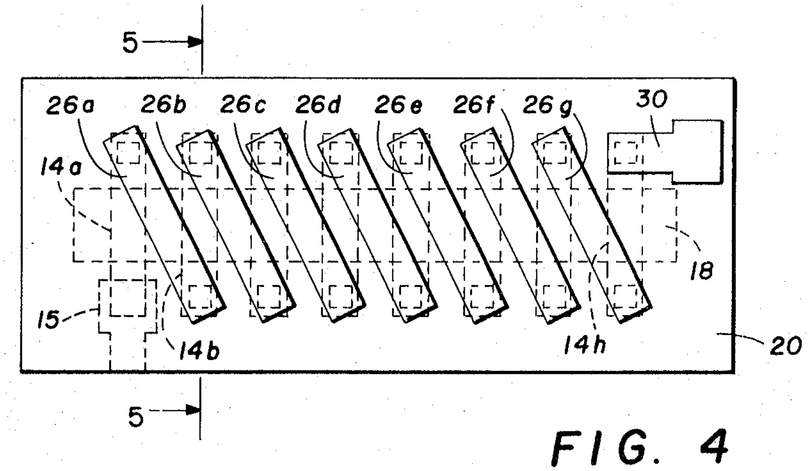
FIG. 4 is a top view of the device shown in FIG. 3, with a second layer of parallel metal strips applied thereto and connected to the lower level of parallel metal strips by feedthrough connections.

FIG. 4 illustrates the final assembly steps for the completion of the inductor. A plurality of parallel metal strips *26a–g* are formed by conventional techniques over the insulating layer 20, the strips being disposed at angles to the lower level of metal strips *14a–h*. The feedthrough holes *22a–h* and *24b–h* are filled with metal feedthrough connections so that opposed ends of adjacent ones of the metal strips *14a–h* are connected by ones of the metal strips *26a–g*. For instance, the opposed ends of adjacent metal strips *14a* and *14b* are connected by the metal strip *26a*.

Additionally, a metal terminal pad 30 is formed on the insulating layer 20 and is connected by a metal feedthrough to the end of one of the lower level metal strip *14h*. It will thus be seen that the two layers of interconnected metal strips comprise a flattened coil or helix which encircles the magnetic bar 18 and which is connected at one terminal to the integrated circuit 13. In some instances, it may be desirable to eliminate the magnetic bar 18 from the inductor.

Figure 5:
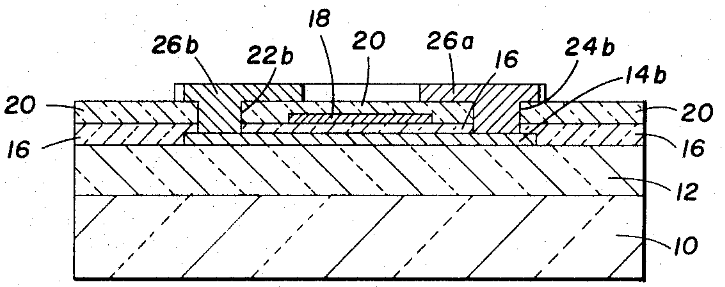
FIG. 5 is a sectional view taken generally along the section lines 5—5 of the device of FIG. 4.

FIG. 5 illustrates a cross section of the completed inductor shown in FIG. 4, wherein it may be seen that the magnetic bar 18 is disposed between insulating layers 16 and 18 between an encircling coil of metal strips. The upper metal strip 26*a* is directly connected via a metal feedthrough connection filling the feedthrough hole 24*b* with one end of the lower metal strip 14*b*. The other end of the lower metal strip 14*b* is connected to the upper metal strip 26*b* by a metal feedthrough connection filling the feedthrough hole 22*b*.

Any number of inductor turns may be fabricated by the invention. In an actual embodiment of the present inductor, a flattened spiral as shown in FIGS. 4 and 5 was constructed having a width of about 0.12 inch and a length of approximately 0.104 inch to provide a helix with 55 turns. The metal strips for both upper and lower levels were constructed from aluminum and were provided with a thickness of approximately 30 microinches. The magnetic bar 18 was constructed from the previously described alloy manufactured and sold under the trade name PERMALLOY, the bar 18 having a thickness in the range of 30 microinches. Insulation layers 16 and 20 surrounding the magnetic bar 18 were provided with a thickness of approximately 5,000 angstroms. Typical measurements for the inductor constructed in accordance with these dimensions were about 47 microhenries and 55 ohms resistance. These measurements shown a marked improvement over previously developed inductors of the same general dimensions.

Figures 6, 7:
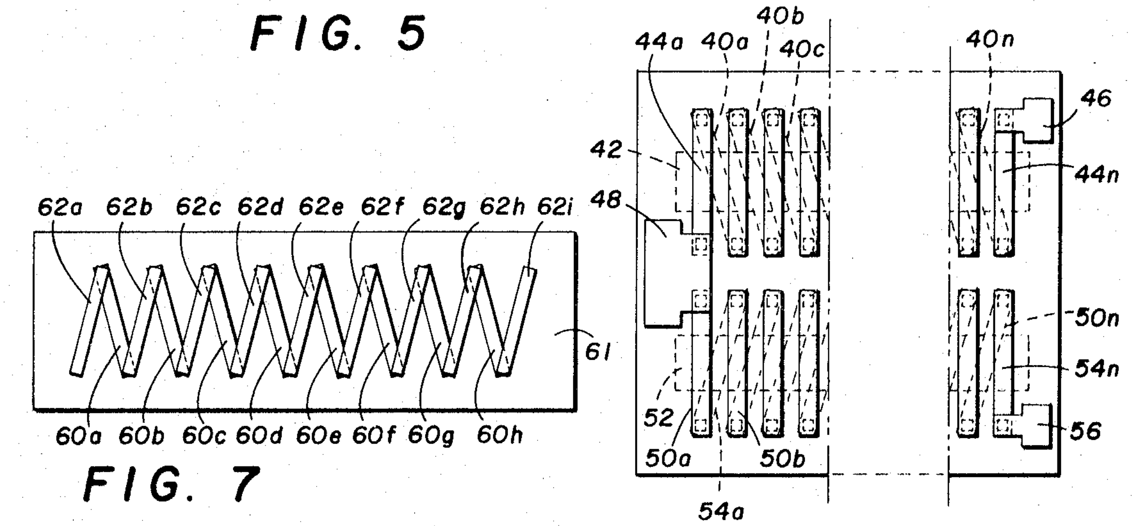
FIG. 6 is a top view of another embodiment of the multilayer inductance of the invention.
FIG. 7 is a top view of another embodiment of a flattened coil inductor according to the invention.

FIG. 6 illustrates two linear inductors formed according to the invention which are compactly connected together in series. The first inductor comprises a plurality of lower level metal strips 40*a–n* and a magnetic bar 42 disposed over an insulating layer and the metal strips 40*a–n*. A plurality of upper level metal strips 44*a–n* are disposed over an insulating layer covering the magnetic bar 42. Strips 44*a–n* are connected through feedthrough holes cut through the insulating layers to opposite ends of adjacent ones of the metal strips 40*a–n*. In this configuration, it will be noticed that the lower level metal strips 40*a–n* are slanted at an angle to vertical, while the upper level metal strips 44*a–n* are aligned with the vertical. In some instances, it may be desirable to slant both the upper and lower levels of metal strips to vertical. Further, in some configurations, it may be desirable to curve portions of the metal strips.

The end of the metal strip 44*n* is connected to a metal terminal pad 46, while the end of the metal strip 44*a* is connected to a metal terminal pad 48. The metal terminal pad 48 is also connected to an end of a metal strip 50*a*. A plurality of additional metal strips 50*b–n* are disposed over an insulating layer which covers a magnetic bar 52. An insulating layer separates magnetic bar 52 from a lower level of metal strips 54*a–n*. A metal terminal pad 56 is connected to an end of the metal strip 50*n*. The metal terminal pads 46 and 56 thus represent output terminals of a single inductor.

Figure 8:
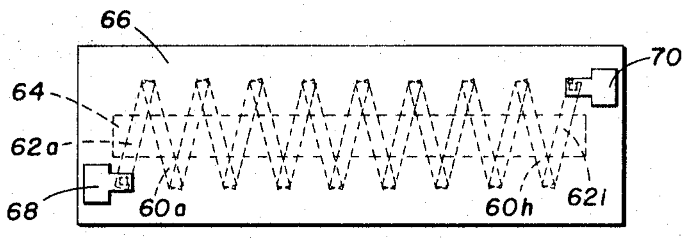
FIG. 8 is a top view of the device shown in FIG. 7 after the application of insulating layers and bar of magnetic material.

FIGS. 7 and 8 illustrate another embodiment of a thin film inductor. In construction of the inductor, a plurality of metal strips 60*a–h* are formed in a parallel configuration by convention evaporation and etching techniques on an insulating oxide surface 61 formed over a semiconductor substrate. A plurality of parallel bars 62*a–i* are formed over the insulating oxide surface 61 in contact with end portions of the metal strips 60*a–h*. An essentially single layer flattened coil or helix is thus formed over the insulating oxide layer 61.

A second layer of insulation is applied over the flattened helix metal strips and a magnetic bar 64 is fabricated thereover. A third layer of insulating oxide 66 is then deposited over the magnetic bar 64. Feedthrough holes are cut through the insulating layers to the ends of the metal strips 62*a* and 62*i*. A metal pad 68 is deposited over the insulating layer 66 and a metal feedthrough connection is formed to electrically connect the pad 68 with the end of the metal strip 62*a*. Similarly, a metal test pad 70 is deposited over the insulating oxide layer 66 and extends through a feedthrough hole for electrical connection with the end of the metal strip 62*i*.

Whereas the present invention has been described with respect to specific embodiments thereof, it will be understood that various changes and modifications will be suggested to one skilled in the art, and it is desired to encompass those changes and modifications as fall within the true scope of the appended claims.

What is claimed is:

1. An integrated circuit of the type having active and passive circuit elements formed therein, and a miniaturized, thin film inductor formed thereon, comprising in combination:

a. a semiconductor substrate having at least one active circuit element formed therein;

b. a first layer of insulating material overlying and adhering to one major surface of said substrate;

c. a first plurality of selectively spaced, thin film conductive members overlying and adhering to said first insulating layer;

d. a conductive contact terminal electrically connected to one end of one of said first conductive members, said contact terminal being selectively connected to said active and passive elements through an opening selectively overlying said active and passive elements;

e. a second layer of insulating material overlying and adhering to said first conductive members and to the exposed areas of said first insulating layer;

f. a thin film magnetic member overlying and adhering to said second insulating layer, said magnetic member being spaced within the area defined by the ends of said first conductive members;

g. a third layer of insulating material overlying and adhering to said magnetic member and to the exposed areas of said second insulating layer;

h. a plurality of spaced opening formed in said second and third insulating layers, said spaced openings respectively overlying and extending to the ends of said first conductive members; and i. a second plurality of selectively spaced, thin film conductive members overlying and adhering to said third insulating layer, each of said second conductive members has one end extending through one of said openings that overlies one end of said first conductive members and is connected thereto, and has its other end extending through another of said openings that overlies one end of another of said first conductive members that is adjacent said one conductive member and is connected thereto;

j. a conductor pad overlying and adhering to said third insulating layer, said conductor pad being electrically connected to one end of said inductor through an opening in said insulating layer selectively overlying said one end of said inductor; wherein k. said first and second conductive members are connected together to form said miniaturized, thin film inductor, said inductor being selectively connected to said active and passive elements by said contact terminal.

2. The integrated circuit of claim 1 wherein:

a. said first and second conductive members are each spaced to form two groups of conductive members; wherein b. said first and second groups of said second conductive members respectively overlying said first and second groups of said first conductive members to produce two spaced, miniaturized, thin film inductors electrically connected to said active element.

3. An integrated circuit of the type having active and passive circuit elements formed therein and a miniaturized, thin film inductor formed thereon, comprising in combination:

a. a semiconductor substrate having at least one active circuit element formed therein;

b. a first layer of insulating material overlying and adhering to one major surface of said substrate;

c. a first plurality of selectively spaced, thin film conductive members overlying and adhering to said first insulating layer;

d. a conductive contact terminal electrically connected to one end of one of said first conductive members, said contact terminal being selectively connected to said active and passive elements through an opening selectively overlying said active and passive elements;

e. A second plurality of selectively spaced, thin film conductive members overlying and adhering to said first insulating layer, each of said second conductive members has one end that overlies one end of one of said first conductive members and is connected thereto, and has its other end overlying one end of another of said first conductive members that is adjacent said one conductive member and is connected thereto;

f. a second layer of insulating material overlying and adhering to said first and second conductive members and to the exposed areas of said first insulating layer; and g. a thin film magnetic member overlying and adhering to said second insulating layer, said magnetic member being spaced within the area defined by the ends of said first conductive members;

h. a conductor pad overlying and electrically connected to one end of said inductor; wherein i. said first and second conductive members are connected together to form said miniaturized, thin film inductor, said inductor being selectively connected to said active and passive elements by said contact terminal.

4. The inductor of claim 1 wherein said conductive strips are constructed from aluminum.

5. The inductor of claim 1 wherein said magnetic material comprises a nickel-iron alloy.

6. The inductor of claim 1 wherein said conductive strips are constructed from tungsten.

7. The inductor of claim 1 wherein said conductive strips are constructed from gold.

8. The inductor of claim 1 wherein said magnetic material comprises a ferrite material.

9. The inductor of claim 1 wherein said magnetic material comprises barium ferrite.